United States Patent [19]

Williams et al.

[11] Patent Number: 5,211,413
[45] Date of Patent: May 18, 1993

[54] TRAILER HAVING SHIFTABLE UNDERCARRIAGE

[75] Inventors: Kelly H. Williams, St. Joseph, Mo.; John S. Harlan, Marysville, Kans.

[73] Assignee: Landoll Corporation, Marysville, Kans.

[21] Appl. No.: 939,999

[22] Filed: Sep. 3, 1992

[51] Int. Cl.$^5$ .............................................. B60P 1/04
[52] U.S. Cl. .................................. 280/194.2; 414/475
[58] Field of Search ............... 280/149.2, 425.2, 407.1; 180/209; 414/484, 475, 477, 480, 482, 483

[56] References Cited

U.S. PATENT DOCUMENTS

| | | | |
|---|---|---|---|
| 2,717,707 | 9/1955 | Martin | 280/149.2 |
| 2,753,064 | 7/1956 | Lesser | 280/149.2 |
| 4,125,198 | 11/1978 | Landoll | 280/149.2 |
| 4,568,235 | 2/1986 | Bills, Jr. | 280/149.2 |

*Primary Examiner*—Tamara L. Graysay
*Attorney, Agent, or Firm*—Hovey, Williams, Timmons & Collins

[57] ABSTRACT

An elongated trailer includes a bed supported on an undercarriage, wherein the undercarriage is shiftable longitudinally between roading and loading positions. At least one beam is provided on the bed and includes a lower flange defining a tracking surface, a web extending upward from the central longitudinal axis of the flange, and forward and rear ramps formed in the tracking surface. The forward and rear ramps are spaced longitudinally from one another and extend laterally inward from opposite sides of the tracking surface. The ramps are of a width greater than one half the width of the tracking surface so that the ramps overlap one another when viewed along the central longitudinal axis, and each ramp extends beneath the web. A pair of rollers are supported on the undercarriage for rotational movement and bear against the central longitudinal axis of the tracking surface and engage the ramps when the undercarriage is shifted to the roading position.

6 Claims, 4 Drawing Sheets

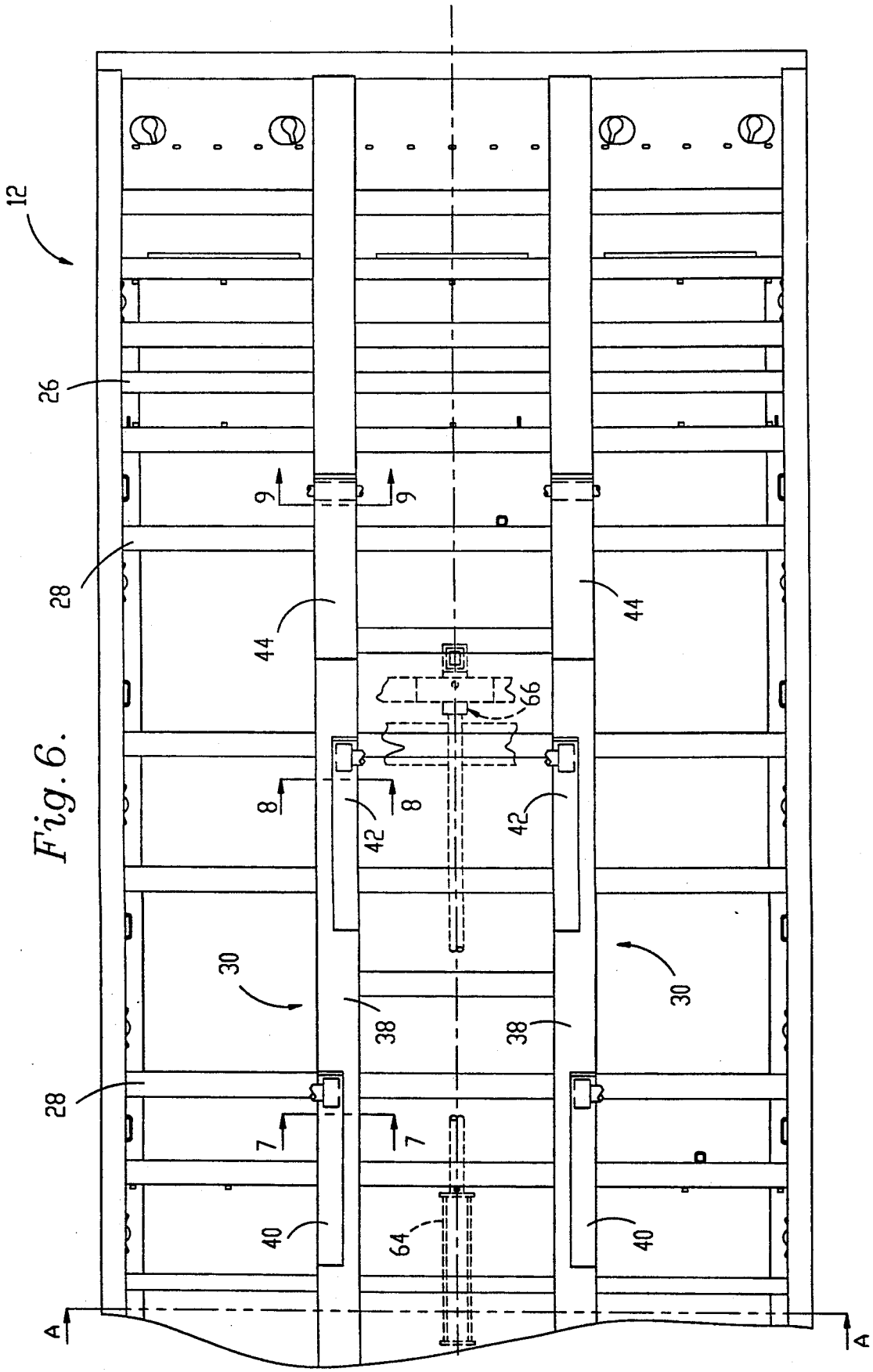

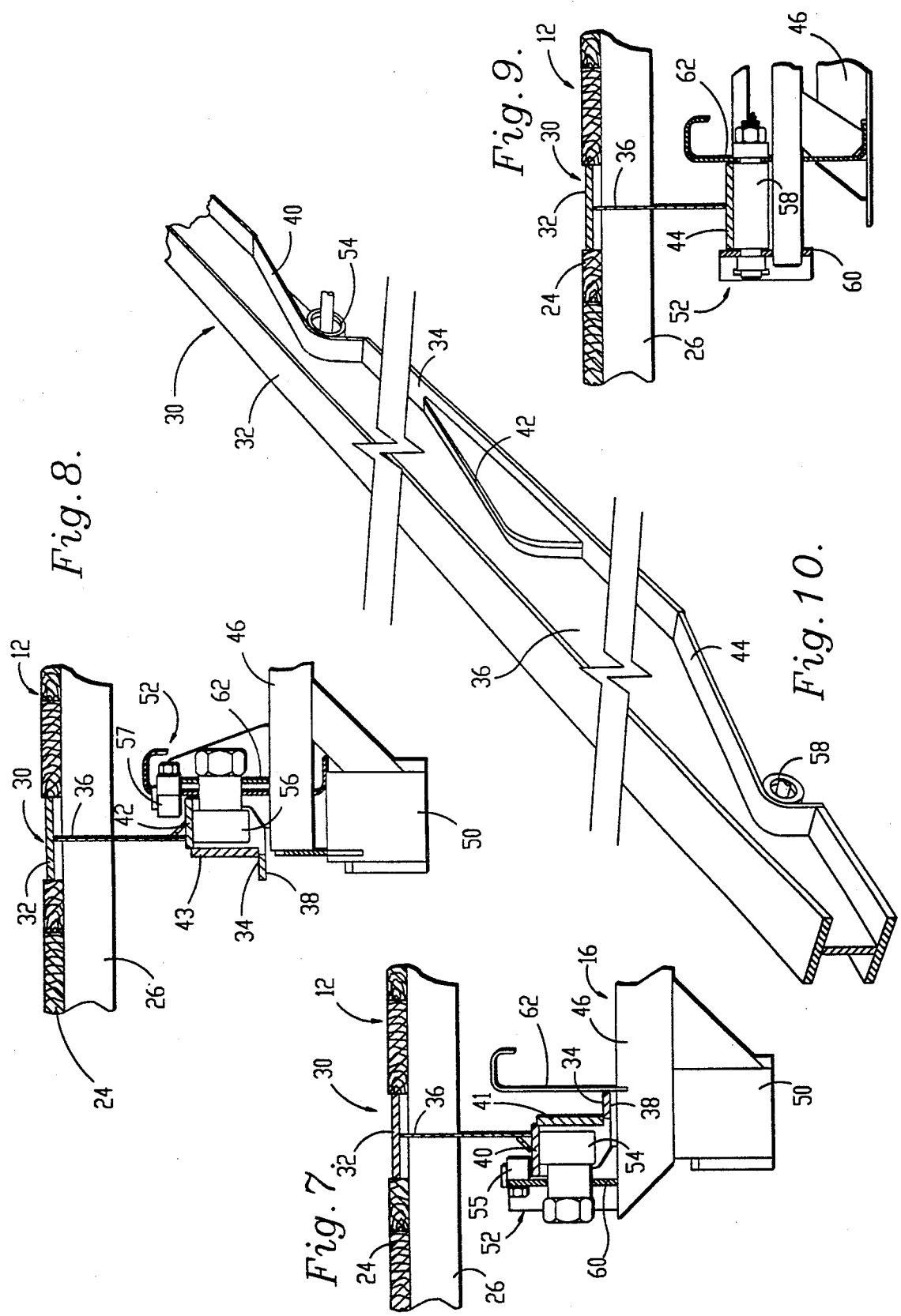

TRAILER HAVING SHIFTABLE UNDERCARRIAGE

BACKGROUND OF THE INVENTION

1. Field of the Invention

The present invention relates generally to transport trailers and, more particularly, to a trailer adapted for use in transporting large specialized vehicles such as farm tractors, combines, and other agricultural machinery.

2. Discussion of the Prior Art

As disclosed in U.S. Pat. No. 4,125,198 to Donald R. Landoll, it is known to provide a trailer having an undercarriage that is shiftable longitudinally relative to a bed of the trailer between a rear, roading position wherein the bed is supported in a lowered, low-to-the-ground orientation, and a forward loading position wherein the bed is raised to a height sufficient to permit unrestricted shifting of the undercarriage in the longitudinal direction of the bed.

Although this conventional construction is effective in providing a trailer presenting a small loading angle while at the same time having the ability to assume a low profile for transport of tall loads, it would be desirable to provide an improved construction of a trailer which would have a prolonged life as compared with the normal useful life of the conventional design.

In the conventional trailer, as disclosed in U.S. Pat. No. 4,125,198, a pair of I-beams are provided, each including a lower flange defining a tracking surface. The undercarriage is provided with a pair of roller assemblies each in tracking engagement with the lower flange of one of the I-beams. Ramps are formed in the lower flanges and are adapted to receive particular rollers of the roller assemblies when the undercarriage is moved to the roading position.

Over prolonged periods of use of the conventional construction, it is possible that each of the lower flanges will begin to bend upward on either side of the associated web under the repetitive application of pressure to the flanges by the rollers. This phenomenon is termed "roll-up". Once roll-up of the flanges begins to occur, contact between the rollers and the tracking surface becomes uneven, with the inside edges of the rollers tending to exert more pressure on the flanges than the outside edges of the rollers. Thus, roller travel along the flanges is complicated, requiring additional power in order to move the undercarriage between positions. Further, in the extreme case, it is possible that the inside edges of the rollers could actually cut into the flanges causing them to weaken and ultimately fracture.

OBJECTS AND SUMMARY OF THE INVENTION

It is an object of the present invention to provide a trailer which overcomes the problems noted above and prolongs the life of the trailer. Further, it is an object of the invention to provide a trailer having a construction capable of supporting increased loads relative to conventional designs.

In accordance with these and other objects evident from the following description of the invention, a trailer includes an elongated bed and an undercarriage supporting the trailer for over-road travel. The undercarriage is shiftable longitudinally between roading and loading positions. A shifting means is provided for shifting the undercarriage between the loading and roading positions, and a lifting means lifts the bed relative to the undercarriage when the undercarriage is shifted to the loading position and lowers the bed when the undercarriage is shifted to the roading position.

The lifting means includes at least one beam extending longitudinally of the bed. The beam is provided with a lower flange having a central longitudinal axis and defining a tracking surface, a web extending upward from the central longitudinal axis of the lower flange, and first and second ramps formed in the tracking surface, the first and second ramps being spaced longitudinally from one another and extending laterally inward from opposite sides of the tracking surface. The ramps are each of a width greater than one half the width of the tracking surface so that the width of the ramps overlap one another when viewed along the central longitudinal axis, and each ramp extends beneath the web of the beam.

A pair of rollers are supported on the undercarriage for rotational movement and are spaced longitudinally from one another by a distance corresponding to the distance of longitudinal spacing of the ramps. The rollers are also offset from one another laterally so that each roller bears against the central longitudinal axis of the tracking surface and engages one of the ramps when the undercarriage is shifted to the roading position.

By this construction, numerous advantages are achieved. For example, by providing a construction wherein the rollers of the undercarriage bear against the lower flange of the I-beam at a position directly beneath the web, support of the flange is provided by the web and roll-up is prevented.

BRIEF DESCRIPTION OF THE DRAWING FIGURES

A preferred embodiment of the invention is described in detail below with reference to the attached drawing figures, wherein:

FIG. 6 is an enlarged, fragmentary, bottom plan view of the rear end of the bed having portions broken away for clarity;

FIG. 7 is an enlarged, fragmentary, cross-sectional view taken along line 7—7 of FIG. 6;

FIG. 8 is an enlarged, fragmentary, cross-sectional view taken along line 8—8 of FIG. 6;

FIG. 9 is an enlarged, fragmentary, cross-sectional view taken along line 9—9 of FIG. 6; and FIG. 10 is an enlarged, fragmentary perspective view of one of the I-beams, illustrating the inter-relationship between ramps provided on the I-beam and rollers adapted to engage the ramps.

DETAILED DESCRIPTION OF THE PREFERRED EMBODIMENT

Figure 1:
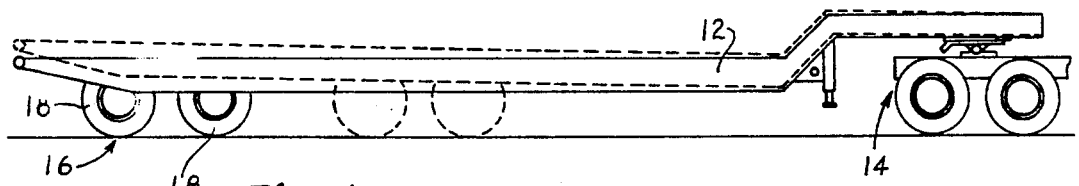
FIG. 1 is a side elevational view of a trailer having a shiftable undercarriage constructed in accordance with the preferred embodiment of the invention, illustrating the trailer in a roading position and showing, in broken lines, a loading position of the trailer.

A trailer constructed in accordance with a preferred embodiment of the invention is shown in FIG. 1, and includes a bed 12 having a front end adapted for connection to a draft vehicle 14, and a rear end adjacent which an undercarriage 16 is provided. The undercarriage includes a plurality of wheels 18 for supporting the trailer for over-road travel and, as described more fully below, the undercarriage is shiftable between a roading position shown in solid lines in FIG. 1, and a loading position illustrated in broken lines.

Figure 2:
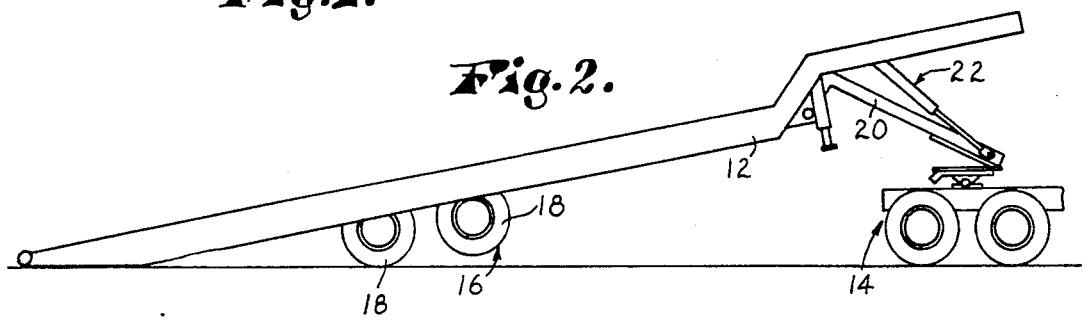
FIG. 2 is a side elevational view of the trailer illustrating the bed in a fully tilted position.

Turning to FIG. 2, the trailer includes a tongue 20 by which the trailer is connected to the draft vehicle 14, e.g. by a fifth wheel. The tongue is pivotally supported by the vehicle to permit tilting of the trailer upward and away from the vehicle upon actuation of a hydraulic cylinder assembly 22 extending between the tongue and the front end of the bed. By tilting the trailer in this direction, the rear end of the bed is lowered to the ground to permit loading of equipment onto the bed.

Figure 3:
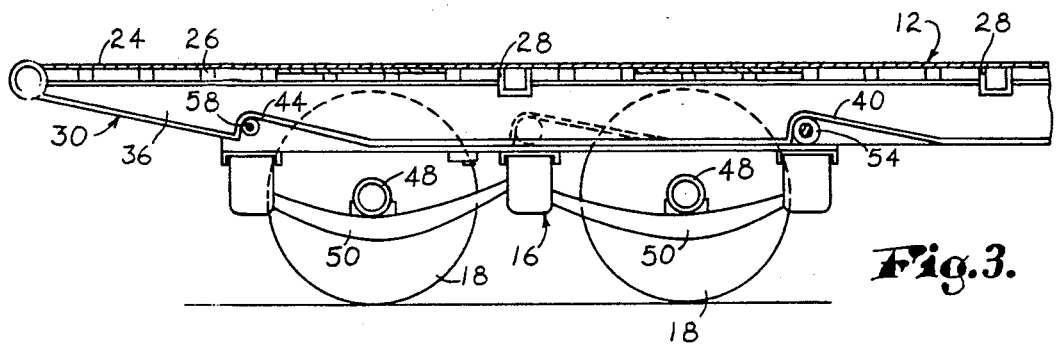
FIG. 3 is an enlarged, fragmentary, longitudinal, cross-sectional view of the rear end of the trailer illustrating the undercarriage in the roading position.
Figure 4:
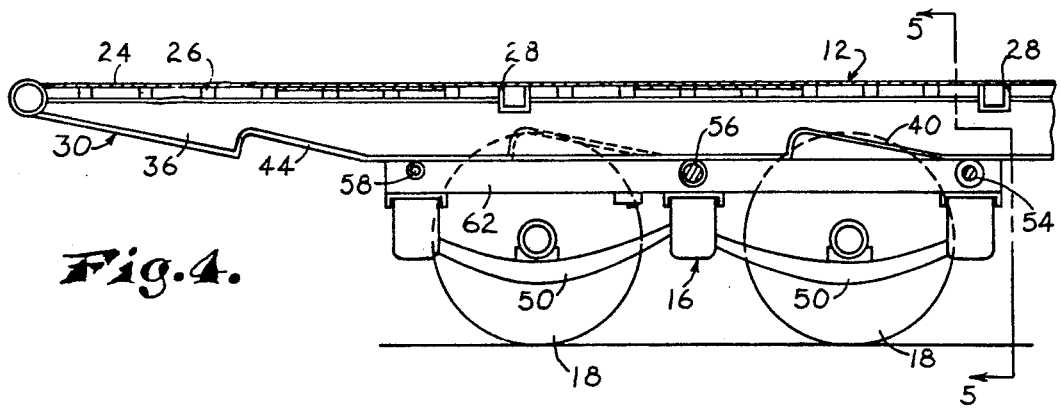
FIG. 4 is an enlarged, fragmentary, longitudinal, cross-sectional view of the rear end of the trailer illustrating the undercarriage in the loading position.

As illustrated in FIG. 3, the bed 12 includes an upper deck 24 supported by a plurality of spaced, transversely extending cross beams 26 and a plurality of lateral support members 28. The support members 28 normally protrude from beneath the upper deck to a height lower than the tops of the wheels 18 when the undercarriage 16 is in the roading position. However, when the undercarriage is shifted toward the loading position, as shown in FIG. 4, the bed 12 is raised to a height sufficient to permit the wheels 18 to clear the cross members 28 and shift longitudinally of the bed.

Figure 5:
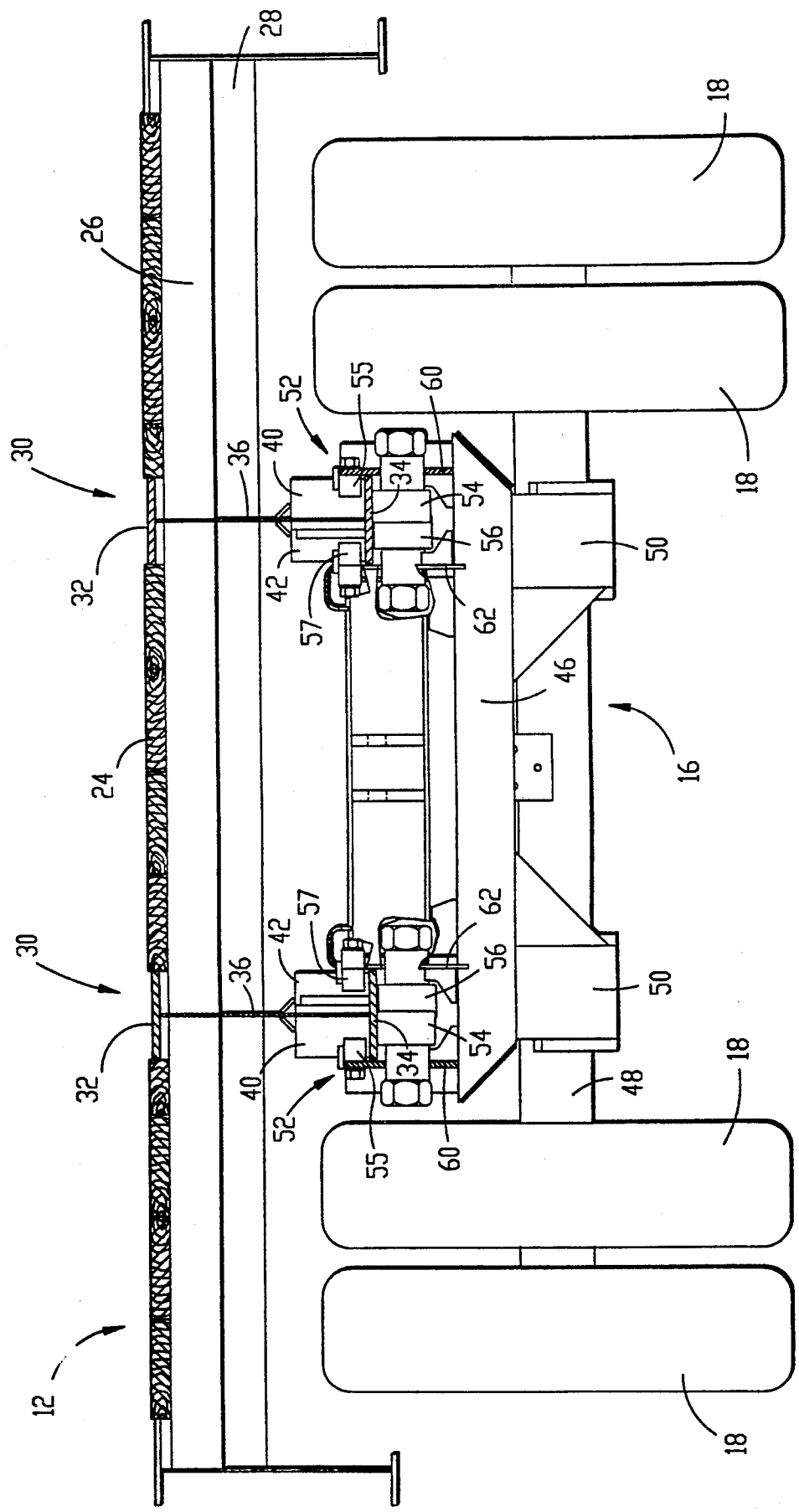
FIG. 5 is a enlarged, fragmentary, cross-sectional view taken along line 5—5 of FIG. 4.

Turning to FIG. 5, the bed is shown to include a pair of laterally spaced, longitudinally extending I-beams 30. Each I-beam includes an upper flange 32 supporting the upper deck 24, and a parallel lower flange 34 separated from the upper flange by a web 36. Each lower flange presents a downward facing tracking surface 38 extending parallel to the bed.

The tracking surface of each beam 30 is formed with three ramps 40, 42, 44, as illustrated in FIG. 6, which are spaced from one another along the length of the I-beam and which are inclined away from the tracking surface 38 toward the rear end of the bed. The forwardmost ramp 40 formed in each tracking surface extends laterally inward from the outer edge of the tracking surface and is of a width slightly greater than one half the width of the tracking surface. Thus, as shown in FIG. 7, a portion of the ramp 40 extends beyond the central longitudinal axis of the tracking surface and directly beneath the web 36 of the beam.

The intermediate ramp 42 is spaced longitudinally along the tracking surface to the rear of the first ramp 40 and extends laterally outward from the inner edge of the tracking surface 38. The intermediate ramp is also formed of a width slightly greater than one half the width of the tracking surface so that a portion of the ramp 42 extends beyond the central longitudinal axis of the tracking surface and directly beneath the web of the beam, as shown in FIG. 8. The ramp 44 is spaced longitudinally behind the intermediate ramp 42 and extends laterally completely across the width of the tracking surface, as shown in FIG. 9.

As shown in FIG. 10, the web of each I-beam extends between the upper and lower flanges, but is removed from areas occupied by the ramps 40, 42, 44 where the ramps extend above the lower flange 34. With respect to each of the ramps 40, 42, a side wall 41, 43 is provided which extends upward from the lower flange 34 to the ramp. These side walls are welded in place to provide support to the remaining portion of the flange 34 disposed laterally adjacent each ramp 40, 42 so as to reinforce the lower flange against bending under the load exerted by the roller 58 as the carriage is shifted forward relative to the bed. Thus, the side walls replace the web in the areas occupied by the ramps 40, 42 while permitting the ramps to directly underlie the web.

The undercarriage 16 is shown in FIG. 3, and includes a main frame 46 (shown in FIG. 5) and a pair of spaced axles 48 supported on the frame by a number of leaf springs 50 or other suitable suspension. Turning to FIG. 4 and 5, the undercarriage 16 is shown as including a roller assembly 52 in tracking disposition relative to each I-beam for supporting the bed on the undercarriage and for permitting longitudinal shifting of the undercarriage between the roading and loading positions. Each roller assembly 52 includes a front roller 54 mounted adjacent the forward end of the frame, a rear roller 58 adjacent the rear end of the frame, and an intermediate roller 56 disposed between the rollers 54, 58. The rollers 54, 56 each have cooperating retainers 55, 57 mounted in spaced relationship thereabove for augmenting the tracking engagement of the rollers with the I-beam.

As shown in FIG. 7, the front roller 54 of each assembly is supported on an outer lateral side wall 60 of the roller assembly 52 and extends inward from the side wall a distance sufficient to ensure that an inner circumferential portion of the roller bears against the tracking surface 38 directly beneath the web 36. Similarly, as shown in FIG. 8, each intermediate roller 56 is supported on an inner lateral side wall 62 of one of the roller assemblies and extends inward from the side wall a distance sufficient to ensure that an inner circumferential portion of the roller bears against the tracking surface directly beneath the web.

As shown in FIG. 5, the two rollers 54, 56 are offset from one another laterally so that the front roller 54 engages the ramp 40 and the intermediate roller 56 engages the ramp 42 when the undercarriage 16 is moved to the roading position. However, the widths of the rollers 54, 56 overlap by a distance sufficient to permit the inner circumferential portions of both rollers to bear against the tracking surface directly beneath the web in order to reduce the bending moment exerted on the flange by the rollers. The rear roller 58 is also supported between the side walls 60, 62, but is formed of a width greater than the rollers 54, 56 and of a smaller diameter. The rear roller is positioned between the side walls to bear against the tracking surface with the center of the roller directly beneath the web, as shown in FIG. 9.

As shown in FIG. 6, and as described more fully in U.S. Pat. No. 4,125,198, which is incorporated herein, a hydraulic piston and cylinder assembly 64 is disposed between the bed 12 and the undercarriage 16 for effecting powered longitudinal shifting of the undercarriage relative to the bed. A coupling 66 is provided between the undercarriage and the bed which permits up and down reciprocation of the undercarriage. Further, the assembly 64 is supported on the bed in a conventional manner for permitting sliding movement of the undercarriage along the bed while maintaining the cylinder assembly parallel to the bed.

Returning to FIG. 2, the hydraulic cylinder assembly 22 is coupled with the bed adjacent the front end for raising and lowering the trailer and hence causing the trailer to tilt upward and away from the vehicle 14. The mechanism includes the tongue 20 which is pivotally mounted at one end to the bed and secured at its opposite end to the draft vehicle.

In operation, the trailer is normally disposed in its roading position as shown for example in solid lines in FIG. 1. When it is desired to load or unload the trailer, the trailer is tilted to a loading position as shown in FIG. 2, wherein the rear end contacts the ground to present a smooth, gentle incline for movement of loads onto the bed.

In order to effect tilting of the trailer from its normal horizontal position to the inclined loading position, the piston and cylinder assembly 64 is retracted to shift the undercarriage 16 forward along the bed to the loading position shown in broken lines in FIG. 1. With the undercarriage so positioned, the hydraulic cylinder assembly 22 is extended tilting the trailer until the rear end contacts the ground as illustrated in FIG. 2. The gradual incline presented by the angled bed permits the load to be driven or otherwise drawn onto the bed. Typically, the load is in the nature of a self-propelled vehicle such that the load is simply driven to a desired position on the bed. However, if the load is not self-propelled, a conventional winch or the like provided adjacent the front end of the trailer may be used to draw the load onto the bed.

After the load has been properly positioned on the bed 12, the hydraulic cylinder assembly 22 is retracted causing the trailer to return to its normal, substantially horizontal position. Next, the piston and cylinder assembly 64 is actuated to cause the undercarriage 16 to move rearward relative to the bed. As the undercarriage approaches the roading position, the rollers 54, 56, 58 engage the ramps 40, 42, 44 and the bed is lowered relative to the undercarriage. This gravity induced, downward movement continues until the rollers contact seats defined by each of the ramps, whereupon the carriage is precluded against further rearward movement and the bed is in its lowermost position relative to the undercarriage. With the undercarriage in this rearmost, roading position, the bed presents an extremely low profile which enables transport of even tall loads on conventional roadways without fear of encountering overhead interference. Unloading of the bed is accomplished in a manner similar to the above described loading operation.

Although the invention has been described with reference to the preferred embodiment illustrated in the attached drawing figures, it is noted that substitutions may be made and equivalents employed herein without departing from the scope of the invention as recited in the claims.

What is claimed is:

1. In an elongated trailer including a bed, an undercarriage provided with a plurality of wheels and supporting the bed, the undercarriage being shiftable longitudinally of the trailer between a roading position in which at least a portion of the bed is supported at a height lower than the tops of the wheels of the undercarriage and a loading position wherein the portion of the bed is supported at a height above the tops of the wheels, a shifting means for shifting the undercarriage, and a lifting means for lifting the bed relative to the undercarriage when the undercarriage is shifted out of the roading position and for lowering the bed when the undercarriage is shifted to the roading position, the improvement comprising:

the lifting means including at least one beam provided on the bed and extending in the longitudinal direction of the trailer, the beam including a lower flange defining a tracking surface of a substantially constant width, a web extending upward from the central longitudinal axis of the lower flange, and first and second ramps formed in the tracking surface, the first and second ramps being spaced longitudinally from one another and extending laterally inward from opposite sides of the tracking surface, the ramps each being of a width greater than one half the width of the tracking surface so that the width of the ramps overlap one another when viewed along the central longitudinal axis and each ramp extends beneath the web of the beam;

the undercarriage including a pair of rollers supported on the undercarriage for rotational movement, the rollers being spaced longitudinally from one another by a distance corresponding to the distance of longitudinal spacing of the ramps and being offset from one another laterally so that each roller bears against the central longitudinal axis of the tracking surface and engages one of the ramps when the undercarriage is shifted to the roading position.

2. An elongated trailer as recited in claim 1, wherein the beam is further provided with a third ramp spaced longitudinally from the first and second ramps in a direction corresponding to the direction of travel of the undercarriage when shifted to the roading position, the third ramp extending laterally the full width of the tracking surface, the undercarriage including a third roller supported on the undercarriage for rotational movement, the third roller being spaced longitudinally from the first and second rollers by a distance corresponding to the distance of spacing of the third ramp to the first and second ramps and being centered relative to the central longitudinal axis of the tracking surface so that the third roller engages the third ramp when the undercarriage is shifted to the roading position.

3. A trailer as recited in claim 1, wherein the at least one beam is an I-beam including an upper flange connected to the bed, the web extending between the upper and lower flanges except in areas of each beam where the first and second ramps extend vertically above the lower flange.

4. A trailer as recited in claim 1, wherein the lifting means includes two beams each provided with a tracking surface and forward and rear ramps, the undercarriage including two pairs of rollers, wherein each pair of rollers engage the tracking surface of one of the beams and engage the ramps of that beam when the undercarriage is shifted to the roading position, the beams being spaced laterally from one another relative to the bed.

5. A trailer as recited in claim 1, wherein each ramp extends upward to a height above the lower flange, and a side wall is provided which extends from the flange upward to the ramp to provide support therebetween.

6. A trailer apparatus comprising:
an elongated bed;
an undercarriage including a plurality of wheels for supporting the trailer for over-road travel, the undercarriage being shiftable longitudinally of the bed between a roading position in which the bed is supported at a lowermost height relative to the undercarriage and a loading position wherein the bed is supported at an uppermost height;

a shifting means for shifting the undercarriage between the loading and roading positions; and a lifting means for lifting the bed relative to the undercarriage when the undercarriage is shifted out of the roading position and for lowering the bed when the undercarriage is shifted to the roading position, the lifting means including at least one beam extending longitudinally of the bed, the beam including a lower flange having a central longitudinal axis and defining a tracking surface, a web extending upward from the central longitudinal axis of the lower flange, and first and second ramps formed in the tracking surface, the first and second ramps being spaced longitudinally from one another and extending laterally inward from opposite sides of the tracking surface, the ramps each being of a width greater than one half the width of the tracking surface so that the width of the ramps overlap one another when viewed along the central longitudinal axis and each ramp extends beneath the web of the beam;

the undercarriage including a pair of rollers supported on the undercarriage for rotational movement, the rollers being spaced longitudinally from one another by a distance corresponding to the distance of longitudinal spacing of the ramps and being offset from one another laterally so that each roller bears against the central longitudinal axis of the tracking surface and engages one of the ramps when the undercarriage is shifted to the roading position.

* * * * *